Patented May 5, 1925.

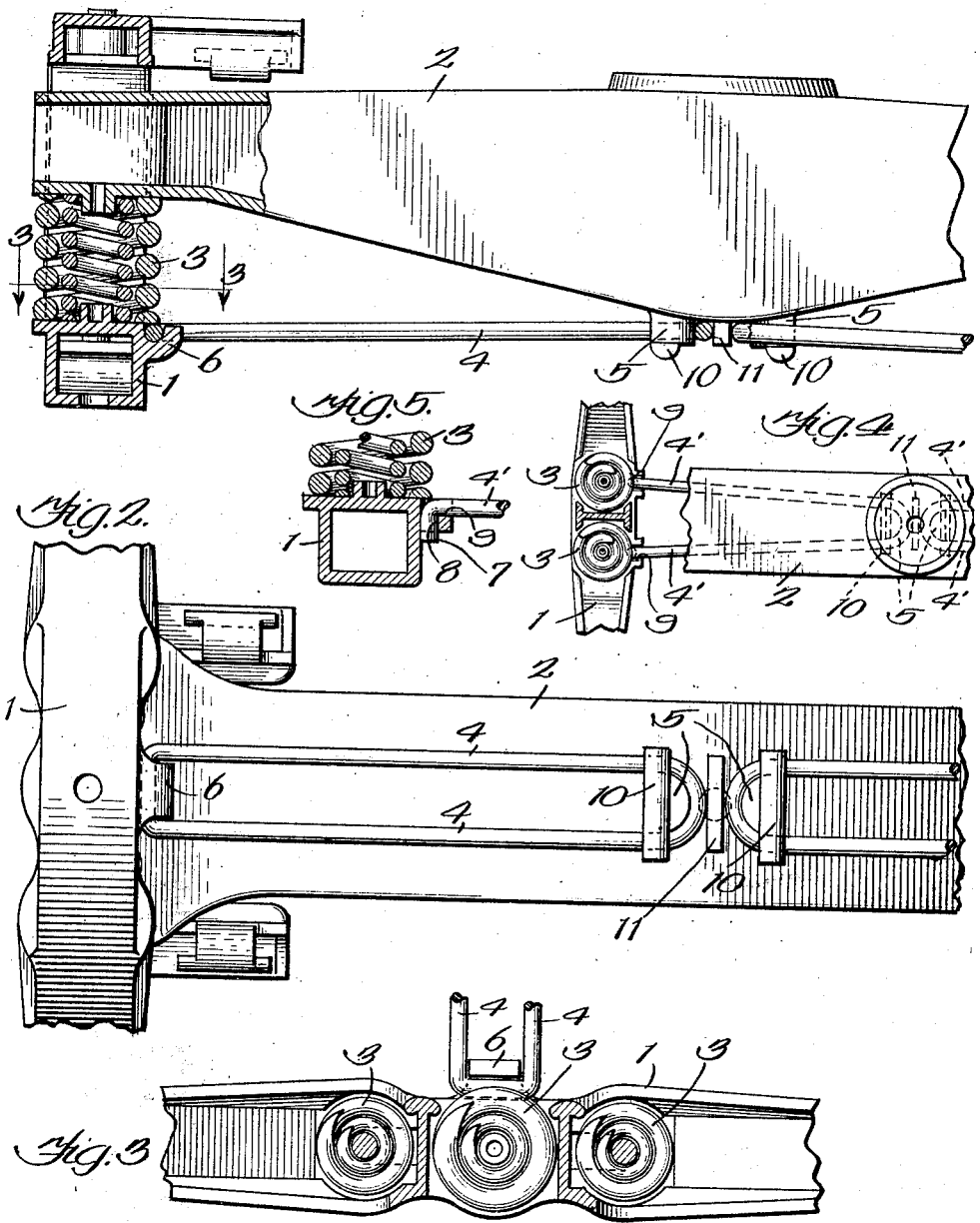

1,536,140

UNITED STATES PATENT OFFICE.

HERMAN C. PRIEBE, OF BLUE ISLAND, ILLINOIS.

RAILROAD-CAR TRUCK.

Application filed February 12, 1924. Serial No. 692,370.

*To all whom it may concern:*

Be it known that I, HERMAN C. PRIEBE, a citizen of the United States, residing at Blue Island, in the county of Cook and the State of Illinois, have invented a certain new and useful Improvement in Railroad-Car Trucks, of which the following is a full, clear, concise, and exact description.

My invention relates to car trucks and provides a novel bracing constituting a supplemental means for assembling the bolsters of car trucks with the car truck side frames.

In carrying out my invention, linkage is employed to unite intermediate portions of the truck bolsters with the side frames of the trucks.

In the preferred embodiment of the invention two links are employed in each truck, one individual to each side frame and serving to connect this frame with an intermediate portion of the associate bolster. The bolster supporting springs desirably serve to maintain the outer ends of the links in assembly with the side frames to which the links are individual. The truck bolster and the inner ends of the links are relatively formed to enable the links to be separable from or adapted for assembly with the truck bolster when the links are in abnormal positions with respect to the truck bolster and to prevent removal of the links when they are in their normal bracing relation with the truck bolster.

The invention will be more fully explained in connection with the accompanying drawing in which Fig. 1 is a transverse sectional view through one of the two truck side frames and a portion of the truck bolster, part of the truck bolster being shown in elevation and part being broken away; Fig 2 is a view from beneath of the structure shown in Fig. 1; Fig. 3 is a sectional view on line 3—3 of Fig. 1; Fig. 4 is a view from beneath of a modified construction; and Fig. 5 is a sectional view on line 5—5 of Fig. 4.

Like parts are indicated by similar characters of reference throughout the different figures.

The truck includes a side frame 1, of any suitable formation, at each side of the truck. The ends of the truck bolster 2 project through openings in the side frames and are supported upon springs 3 which are located within these openings and are supported upon the bottom members of the frames. In the structure shown in Figs. 1 to 3 inclusive, two chain-like links 4, one individual to each side frame, connect such frame with an intermediate portion 5 upon the bottom of the truck bolster, this bolster overlying the links. The outer end of each link is received in a socket 6 carried by and preferably integrally formed with the inner side of the bottom member of the contiguous side frame. Each socket is preferably in the nature of an upwardly facing hook and is so located as to have the contiguous bolster supporting spring 3 overlie it, said socket being so close to the bottom end of this spring as to enable this spring to hold the outer end of the adjacent link firmly in the socket.

In the structure of Figs. 4 and 5 each link 4' is in the form of a U-shaped loop whose outer ends have angular continuations 7 entering sockets 8 formed upon the inner side of the bottom member of the contiguous side frame. The horizontal portions of the links shown in Figs. 4 and 5 are received in grooves 9 that are inwardly continued from the sockets 8 and extend transversely of the truck. These sockets 8 are so located that the bolster supporting springs 3 will overlie the same and hold the adjacent ends of the loop shaped link 4' in the sockets 8 and the grooves 9.

In the preferred embodiments of both forms of the invention the portions 5 at the bottoms of the truck bolsters have underlying bars 10 extending crosswise of the truck bolster to constitute with the portions 5 inverted T shaped elements. In the process of assembly, the links are placed lengthwise of the car truck, or sufficiently angular to the truck bolster, so that the elongated openings in the links will be positioned to permit the bars 10 to pass therethrough, whereafter the links are turned to be parallel with the truck bolster and have their outer ends presented for assembly with the truck side frames. The elongated openings in the links are sufficiently narrow with respect to the truck bolster portions 5 and with respect to the bars 10 at the bottoms of these portions 5 as to enable the bars to permanently project crosswise of these openings beyond the same, to underlie the sides of the links and thereby prevent them from dropping out of position. The link engaging portions 5 of the truck bolster are so shaped as substantially to fill the bights at the inner ends of the links, the bars 10 being sufficiently offset from these portions 5 outwardly toward the side frames as to underlie the straight side portions of the links. The movement of the lower portions of the side frames outwardly with respect to the truck bolster is obstructed by the engagement of the parts 5 with the bights at the inner ends of the links. A lug 11 is cast upon the mid portion of the bottom of the truck bolster, this lug being of sufficient width to fill the space where the inner ends of the two links are closest and to hold the links in position to maintain the parts 5 in their inner bights. The lug 11 thus prevents inward movement of the lower portions of the side frames with respect to the bolster.

It is obvious that changes may be made without departing from the spirit of my invention.

Having thus described my invention I claim as new and desire to secure by Letters Patent the following:—

1. A car truck including the side frames thereof; a truck bolster extending between the side frames; bolster supporting springs carried by the side frames; and linkage connecting the side frames with intermediate portions of the bolster and held in assembly with the side frames by said springs.

2. A car truck including the side frames thereof; a truck bolster extending between the side frames; bolster supporting springs carried by the side frames; and linkage connecting the side frames with intermediate portions of the bolster, the side frames having upwardly facing hooks receiving the linkage at the side frames and closely underlying said springs that hold the linkage and side frames in assembly.

3. A car truck including the side frames thereof; a truck bolster extending between the side frames; bolster supporting springs carried by the side frames; and linkage connecting the side frames with intermediate portions of the bolster, the side frames having sockets receiving the linkage at the side frames and positioning the adjacent portions of the same closely beneath the springs that hold the linkage and side frames in assembly.

4. A truck including the side frames thereof; a truck bolster extending between the side frames; bolster supporting springs carried by the side frames; and two links, one individual to each side frame, each link connecting the side frame to which it is individual with an intermediate portion of the bolster and having its outer end held in assembly with such side frame by the spring element carried by this side frame.

5. A car truck including the side frames thereof; a truck bolster extending between the side frames; bolster supporting springs carried by the side frames; and two links, one individual to each side frame, each link connecting the side frame to which it is individual with an intermediate portion of the bolster, the side frames having upwardly facing hooks receiving the outer ends of the links that are individual to the side frames and closely underlying said springs that hold the links and side frames in assembly.

6. A car truck including the side frames thereof; a truck bolster extending between the side frames; bolster supporting springs carried by the side frames; and two links, one individual to each side frame, each link connecting the side frame to which it is individual with an intermediate portion of the bolster, the side frames having sockets receiving the outer ends of the links that are individual to the side frames and closely underlying said springs that hold the links and side frames in assembly.

7. A truck including the side frames thereof; a truck bolster extending between the side frames; bolster supporting springs carried by the side frames; and two links, one individual to each side frame, each link connecting the side frame to which it is individual with an intermediate portion of the bolster and having its outer end held in assembly with such side frame by the spring element carried by this side frame, the inner ends of the links and intermediate portions of the truck bolster being relatively formed to be adapted for assembly when the links are in abnormal position with respect to the truck bolster and to prevent separation of the links from the bolster when the links are in normal relation thereto.

8. A car truck including the side frames thereof; a truck bolster extending between the side frames; bolster supporting springs carried by the side frames; and two links, one individual to each side frame, each link connecting the side frame to which it is individual with an intermediate portion of the bolster, the side frames having upwardly facing hooks receiving the outer ends of the links that are individual to the side frames and closely underlying said springs that hold the links and side frames in assembly, the inner ends of the links and intermediate portions of the truck bolster being relatively formed to be adapted for assembly when the links are in abnormal position with respect to the truck bolster and to prevent separation of the links from the bolster when the links are in normal relation thereto.

9. A car truck including the side frames thereof; a truck bolster extending between the side frames; bolster supporting springs carried by the side frames; and two links, one individual to each side frame, each link connecting the side frame to which it is individual with an intermediate portion of the bolster, the side frames having sockets receiving the outer ends of the links that are individual to the side frames and closely underlying said springs that hold the links and side frames in assembly, the inner ends of the links and intermediate portions of the truck bolster being relatively formed to be adapted for assembly when the links are in abnormal position with respect to the truck bolster and to prevent separation of the links from the bolster when the links are in normal relation thereto.

10. A truck including the side frames thereof; a truck bolster extending between the side frames; bolster supporting springs carried by the side frames; and two links, one individual to each side frame, each link connecting the side frame to which it is individual with an intermediate portion of the bolster and having its outer end held in assembly with such side frame by the spring element carried by this side frame, the links having elongated openings extending lengthwise thereof and the truck bolster having T shaped portions whose heads are of a size that they may pass through said openings when the links are angular to the bolster and will engage the sides of the links when these links are in normal relation to the bolster.

11. A car truck including the side frames thereof; a truck bolster extending between the side frames; bolster supporting springs carried by the side frames; and two links, one individual to each side frame, each link connecting the side frame to which it is individual with an intermediate portion of the bolster, the side frames having upwardly facing hooks receiving the outer ends of the links that are individual to the side frames and closely underlying said springs that hold the links and side frames in assembly, the links having elongated openings extending lengthwise thereof and the truck bolster having T shaped portions whose heads are of a size that they may pass through said openings when the links are angular to the bolster and will engage the sides of the links when these links are in normal relation to the bolster.

12. A car truck including the side frames thereof; a truck bolster extending between the side frames; bolster supporting springs carried by the side frames; and two links, one individual to each side frame, each link connecting the side frame to which it is individual with an intermediate portion of the bolster, the side frames having sockets receiving the outer ends of the links that are individual to the side frames and closely underlying said springs that hold the links and side frames in assembly, the links having elongated openings extending lengthwise thereof and the truck bolster having T shaped portions whose heads are of a size that they may pass through said openings when the links are angular to the bolster and will engage the sides of the links when these links are in normal relation to the bolster.

13. A car truck including the side frames thereof; a truck bolster extending between the side frames; bolster supporting springs carried by the side frames; and linkage connecting the side frames with the bolster and held in assembly with the side frames by said springs.

14. A car truck including the side frames thereof; a truck bolster extending between the side frames; bolster supporting springs carried by the side frames; and linkage connecting the side frames with the bolster, the side frames having upwardly facing hooks receiving the linkage at the side frames and closely underlying said springs that hold the linkage and side frames in assembly.

15. A car truck including the side frames thereof; a truck bolster extending between the side frames; bolster supporting springs carried by the side frames; and linkage connecting the side frames with the bolster, the side frames having sockets receiving the linkage at the side frames and positioning the adjacent portions of the same closely beneath the springs that hold the linkage and side frames in assembly.

16. A car truck including the side frames thereof; a truck bolster extending between the side frames; bolster supporting springs carried by the side frames; and linkage connecting the side frames with bottom and intermediate portions of the bolster and held in assembly with the side frames by said springs.

17. A truck including the side frames thereof; a truck bolster extending between the side frames; bolster supporting springs carried by the side frames; and two links, one individual to each side frame, each link connecting the side frame to which it is individual with a bottom and intermediate portion of the bolster and having its outer end held in assembly with such side frame by the spring element carried by this side frame.

18. A car truck including the side frames thereof; a truck bolster extending between the side frames; bolster supporting springs carried by the side frames; and linkage connecting the side frames with bottom and intermediate portions of the bolster.

19. A truck including the side frames thereof; a truck bolster extending between the side frames; and two links, one individual to each side frame, each link connecting the side frame to which it is individual with a bottom and intermediate portion of the bolster.

In witness whereof, I hereunto subscribe my name.

HERMAN C. PRIEBE.